US012658095B2

(12) United States Patent
Chien

(10) Patent No.: US 12,658,095 B2
(45) Date of Patent: Jun. 16, 2026

(54) METHOD AND INTEGRATED CIRCUIT FOR DRIVING DISPLAY PANEL, AND DISPLAY APPARATUS

(71) Applicant: NOVATEK MICROELECTRONICS CORP., Hsinchu (TW)

(72) Inventor: Tso-Hua Chien, Hsinchu (CN)

(73) Assignee: NOVATEK MICROELECTRONICS CORP., Taiwan (CN)

( * ) Notice: Subject to any disclaimer, the term of this patent is extended or adjusted under 35 U.S.C. 154(b) by 0 days.

(21) Appl. No.: 18/756,820

(22) Filed: Jun. 27, 2024

(65) Prior Publication Data

US 2025/0209956 A1 Jun. 26, 2025

Related U.S. Application Data

(60) Provisional application No. 63/612,969, filed on Dec. 20, 2023.

(30) Foreign Application Priority Data

Apr. 22, 2024 (CN) ......................... 202410483415.2

(51) Int. Cl.
*G09G 3/20* (2006.01)

(52) U.S. Cl.
CPC ... *G09G 3/2092* (2013.01); *G09G 2310/0267* (2013.01); *G09G 2310/08* (2013.01); *G09G 2330/023* (2013.01); *G09G 2330/045* (2013.01)

(58) Field of Classification Search
CPC ......... G09G 3/2092; G09G 2310/0267; G09G 2310/08; G09G 2330/023; G09G 2330/045; G09G 3/20; G09G 3/2022; G09G 2330/021
See application file for complete search history.

(56) References Cited

U.S. PATENT DOCUMENTS

2007/0132683 A1* 6/2007 Kong ................... G09G 3/3648 345/87
2008/0278467 A1* 11/2008 Hwang ................ G09G 3/3648 345/87
2011/0115839 A1* 5/2011 Takahashi ............ H10D 86/423 345/698
2013/0187937 A1* 7/2013 Kerofsky ................. G09G 3/20 345/530
2013/0335309 A1* 12/2013 Kerofsky ............. G09G 3/3406 345/102
2014/0156734 A1* 6/2014 Stankoulov ............... G06F 9/00 709/203
2015/0194121 A1* 7/2015 Lee ...................... G09G 3/3677 345/212
2015/0348508 A1* 12/2015 Her ...................... G09G 3/3266 345/82

(Continued)

*Primary Examiner* — Jose R Soto Lopez
(74) *Attorney, Agent, or Firm* — MARSHALL, GERSTEIN & BORUN LLP

(57) ABSTRACT

The present disclosure relates to a method for driving a display panel. The method includes: determining whether or not to perform a refresh operation on a current frame to be displayed by the display panel; and when it is determined not to perform the refresh operation on the current frame, refraining from sending a frame scanning start signal (e.g., an STV signal) to the display panel, and reducing the frequency of a gate clock signal or fixing the gate clock signal to a specific voltage level.

6 Claims, 4 Drawing Sheets

(56) References Cited

U.S. PATENT DOCUMENTS

| | | | | |
|---|---|---|---|---|
| 2016/0035320 | A1* | 2/2016 | Yoon | G09G 3/20 345/213 |
| 2016/0117987 | A1* | 4/2016 | Byun | G09G 3/3266 345/205 |
| 2016/0203755 | A1* | 7/2016 | Kim | H04B 15/00 345/545 |
| 2017/0098413 | A1* | 4/2017 | Lee | G09G 3/3233 |
| 2018/0012552 | A1* | 1/2018 | Masui | G09G 5/395 |
| 2018/0102101 | A1* | 4/2018 | Wang | G09G 3/3674 |
| 2018/0218706 | A1* | 8/2018 | Gong | G09G 3/36 |
| 2018/0293949 | A1* | 10/2018 | Nakamura | G09G 5/00 |
| 2019/0005884 | A1* | 1/2019 | Yoo | G09G 3/3266 |
| 2023/0109361 | A1* | 4/2023 | Lee | G09G 3/3233 257/40 |
| 2024/0257765 | A1* | 8/2024 | Kim | G09G 3/3233 |
| 2024/0312395 | A1* | 9/2024 | Kim | G09G 3/2096 |
| 2025/0078711 | A1* | 3/2025 | Tseng | G09G 3/3233 |

* cited by examiner

METHOD AND INTEGRATED CIRCUIT FOR DRIVING DISPLAY PANEL, AND DISPLAY APPARATUS

TECHNICAL FIELD

The present disclosure relates to drive technology for display panels, and more specifically, to a method and an integrated circuit for driving a display panel, and a display apparatus.

BACKGROUND

With the continuous development of the display technology, consumers have high requirements for the performance of display screens (e.g., screens of cell phones or tablet devices). Therefore, in order to improve user's experience, it is not only required that images presented by a display panel have a high resolution as well as good color and brightness, but also the smoothness of dynamic pictures, which mainly depends on the refresh rate of the display panel.

In this filed, the refresh rate refers to the number of times a displayed picture is refreshed per unit of time, a picture displayed each time corresponds to a frame, and thus the refresh rate may also be called frame rate, which is usually in the unit of Hertz (Hz). At present, the common examples of display frame rate includes, such as 60 Hz, 90 Hz, 144 Hz, 240 Hz. For example, the frame rate of the display panel is 60 Hz, which means that the display panel displays 60 frames per second. As can be seen, the higher frame rate of the display panel, the smoother dynamic pictures it presents, and thereby bringing users a better viewing experience of the dynamic pictures. On the other hand, an increase in the number of frames to be displayed per unit of time means that the frequency of scanning and resetting (i.e., refresh operation) of pixels by the display panel will also increase accordingly, resulting in a significantly increase in the overall power consumption of the display panel, and thereby leading to problems such as insufficient endurance and heat generation of the display apparatus.

SUMMARY

In view of this, the power consumption of a display panel can be reduced to a certain extent by adopting technologies such as adaptive frame rate and multi-area frame rate, such that the display panel may display at different frame rates according to characteristics of a picture to be displayed, for example, a static picture or a static area in the picture can be displayed at a lower frame rate, so as to reduce the power consumption of the display panel to some extent. Nevertheless, there is still a need in the art to propose a method and apparatus for further reducing the power consumption of the display panel.

In order to solve at least technical problems as above, present disclosure provides a method and an integrated circuit for driving a display panel, and a corresponding display apparatus, for reducing the power consumption of the display panel.

According to an aspect of the present disclosure, a method is provided for driving a display panel. The method includes: determining whether or not to perform a refresh operation on a current frame to be displayed by the display panel; and when it is determined not to perform the refresh operation on the current frame, refraining from sending a frame scanning start signal to the display panel.

According to an embodiment of the present disclosure, the method further includes: when it is determined not to perform the refresh operation on the current frame, reducing the frequency of a gate clock signal sent to the display panel, or fixing the gate clock signal sent to the display panel to a specific voltage level.

According to an embodiment of the present disclosure, the method further includes: obtaining frame refresh information, the frame refresh information indicating whether or not to perform the refresh operation on at least part of areas in the current frame; and determining, based on the frame refresh information, whether or not to perform the refresh operation on the at least part of areas in the current frame to be displayed by the display panel; when it is determined not to perform the refresh operation on all areas in the current frame, refraining from sending a frame scanning start signal to the display panel, and reducing the frequency of a gate clock signal or fixing the gate clock signal to a specific voltage level; when it is determined to perform the refresh operation on the at least part of areas in the current frame, sending the frame scanning start signal to the display panel to initiate the refresh operation on the at least part of areas, which specifically includes sending the frame scanning start signal to a gate driver-on-array circuit of the display panel, and sending a refresh control signal and the gate clock signal; where the gate driver-on-array circuit includes a plurality of cascaded gate driver units, and in response to a first-stage gate driver unit in the gate driver-on-array circuit receiving the frame scanning start signal, the gate driver-on-array circuit performs the refresh operation on the at least part of areas based on the refresh control signal and the gate clock signal.

According to another aspect of the present disclosure, provided is an integrated circuit for driving a display panel, including: a module, configured to determine whether or not to perform a refresh operation on a current frame to be displayed by the display panel; and a module, configured to send a frame scanning start signal for initiating the refresh operation and a gate clock signal for performing the refresh operation, to the display panel, where the integrated circuit refrains from sending the frame scanning start signal to the display panel when it is determined not to perform the refresh operation on the current frame.

According to an embodiment of the present disclosure, when it is determined not to perform the refresh operation on the current frame, the integrated circuit reduces the frequency of the gate clock signal or fixes the gate clock signal to a specific voltage level.

According to an embodiment of the present disclosure, the integrated circuit further includes a module, configured to obtain frame refresh information. The frame refresh information indicates whether or not to perform the refresh operation on at least part of areas in the current frame, and the integrated circuit determines whether or not to perform the refresh operation on the at least part of areas in the current frame based on the frame refresh information. When it is determined not to perform the refresh operation on all areas in the current frame, the integrated circuit refrains from sending the frame scanning start signal to the display panel, and reduces the frequency of the gate clock signal or fixes the gate clock signal to a specific voltage level.

According to another aspect of the present disclosure, provided is a display apparatus, including a display panel, including a gate driver-on-array circuit, the gate driver-on-array circuit including a plurality of cascaded gate driver units; and an integrated circuit, configured to receive frame refresh information indicating whether or not to perform a refresh operation on at least part of areas in the current frame to be displayed by the display panel, and to send a frame scanning start signal for initiating the refresh operation to the gate driver-on-array circuit. When the frame refresh information indicates not to perform the refresh operation on all areas in the current frame, the integrated circuit refrains from sending the frame scanning start signal to the gate driver-on-array circuit, and/or the integrated circuit reduces the frequency of a gate clock signal or fixes the gate clock signal to a specific voltage level.

According to the above-mentioned method and integrated circuit for driving the display panel of the present disclosure, the action of sending related signals to the display panel can be adjusted according to whether a refresh operation needs to be performed on the current frame or on the at least part of areas in the current frame. Specifically, the present disclosure proposes a solution of dynamic frame scanning start signal, and for a frame that does not need to be refreshed, the frame scanning start signal is not provided, and accordingly the switching loss of the gate driver circuit is reduced. Moreover, a solution of dynamic gate clock refresh is further proposed, and for the frame that does not need be refreshed, the frequency of the gate clock signal is reduced or the gate clock signal is fixed to a specific voltage level, so that the energy consumption is further reduced while normal display is ensured.

BRIEF DESCRIPTION OF THE DRAWINGS

The advantages of various aspect of the present disclosure will become clearer and easier to understand by the following description of embodiments in conjunction with the accompanying drawings, in which.

Figure 1A:
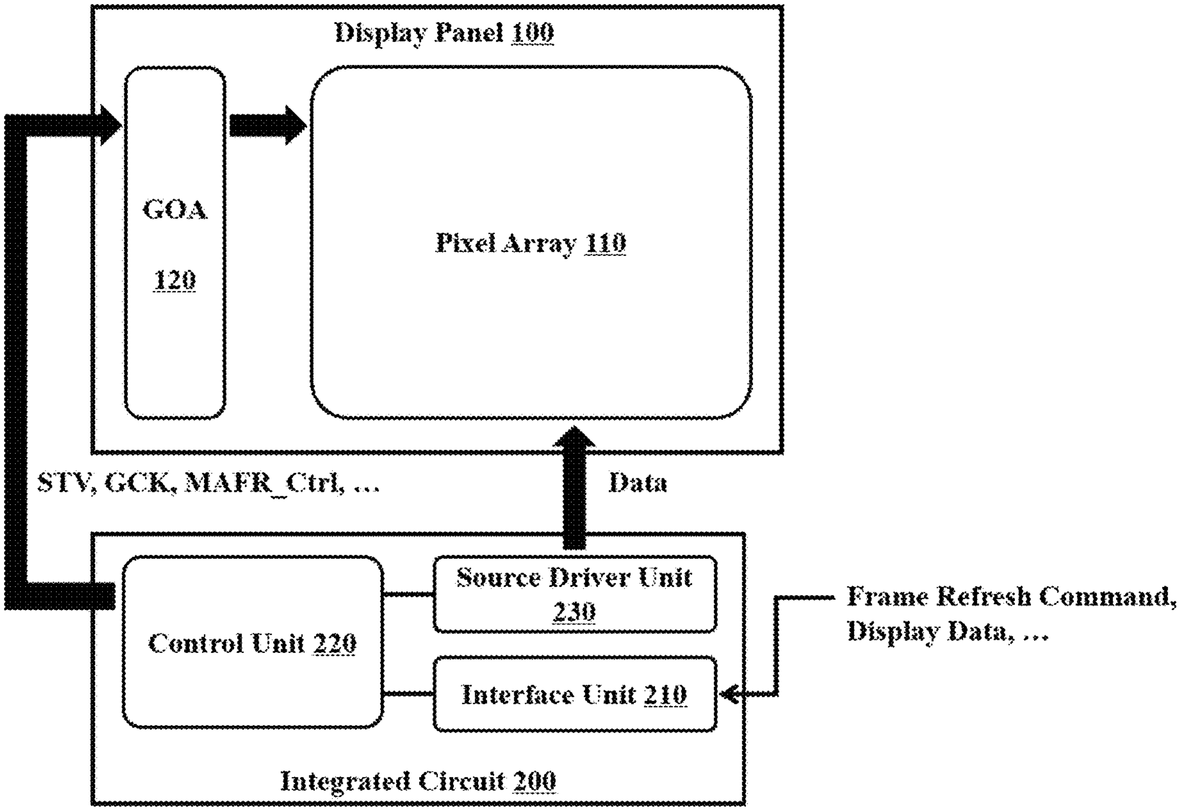
FIG. 1A is a block diagram illustrating a display panel and an integrated circuit for driving the display panel according to an embodiment of the present disclosure.

It should be understood that these figures are intended for further understanding of the embodiments of the present disclosure, constitute a part of the specification and do not constitute a limitation on the present disclosure. In addition, in the accompanying drawings, the same reference numerals usually represent the same components or steps.

LIST OF REFERENCE NUMERALS

100: display panel
101: dynamic area
102: static area
110: pixel array
120, 120': driver-on-array, GOA
121 to **12*n***: first-stage gate driver unit
1210: logical operation module
200: integrated circuit
210: interface unit
220: control unit
230: source driver unit

DETAILED DESCRIPTION

In order to explain the technical solutions of the present disclosure, embodiments will be described in detail in conjunction with the accompanying drawings in the following. It should be understood that based on the embodiments described in the present disclosure, all other embodiments obtained by a person skilled in the art without creative efforts should fall within the scope of protection of the present disclosure, the embodiments described herein are only some rather than all of the embodiments of the present disclosure, and these embodiments are merely illustrative and exemplary, and thus should not be construed as limiting the scope of the disclosure.

In the following, for the purpose of illustration rather than limitation, the present disclosure will mainly take a display panel based on multi-area frame rate control as an example to elaborate on the technical concepts of the present disclosure, and it should be understood that the technical solutions of the present disclosure can also be applied to display panels using other frame refresh technologies such as adaptive frame rate.

FIG. 1A is a block diagram illustrating a display panel and an integrated circuit for driving the display panel according to an embodiment of the present disclosure. As shown in FIG. 1A, the display panel 100 may include a pixel array 110 and a Gate driver-On-Array (GOA) circuit (represented by GOA 120 in figures). The pixel array 110 is an array including a plurality of rows and columns of pixels, and the GOA 120 is coupled to a gate line in the pixel array 110 to perform progressive scanning to corresponding rows of pixels in the pixel array 110 so as to perform a refresh operation on the pixels. An internal circuit of the GOA is described in detail below with reference to FIGS. 2 and 3. In addition, an integrated circuit 200 is configured to receive signals related to displaying and to provide the display panel 100 with several signals for driving and displaying, and may include: an interface unit 210 configured to receive (e.g., from an external device or other element of the device) a frame display signal related to a current frame to be displayed by the display panel 100, such as a frame refresh signal indicating whether or not to perform a refresh operation on the current frame, display data for displaying the current frame, or the like; a control unit 220 configured to provide a frame scanning start signal (e.g., Source Timing Validation, STV) to the GOA 120 in the display panel 100 so that the GOA 120 can initiate the execution of a GOA refresh operation in response to the frame scanning start signal, and send a refresh control (e.g., "Multi-Area Frame Rate Control", MAFR_CTRL) signal and a gate clock (Gate Clock, GCK) signal to the GOA 120, so that the GOA 120 can perform the refresh operation based on the MAFR_CTRL signal and the GCK signal; and a source driver unit 230 coupled to a source line in the pixel array 110 to provide the pixel array 110 with an image data signal (Data) for displaying. Alternatively, the interface unit 210, the control unit 220, and the source driver unit 230 may be communicatively coupled to each other for signal transmission. The various components included in the integrated circuit 200 described in the above example are only exemplary. It can be understood that the integrated circuit 200 may further include other components for performing necessary functions, and these components may also be implemented by one or more other components integrating corresponding functions.

Figure 1B:
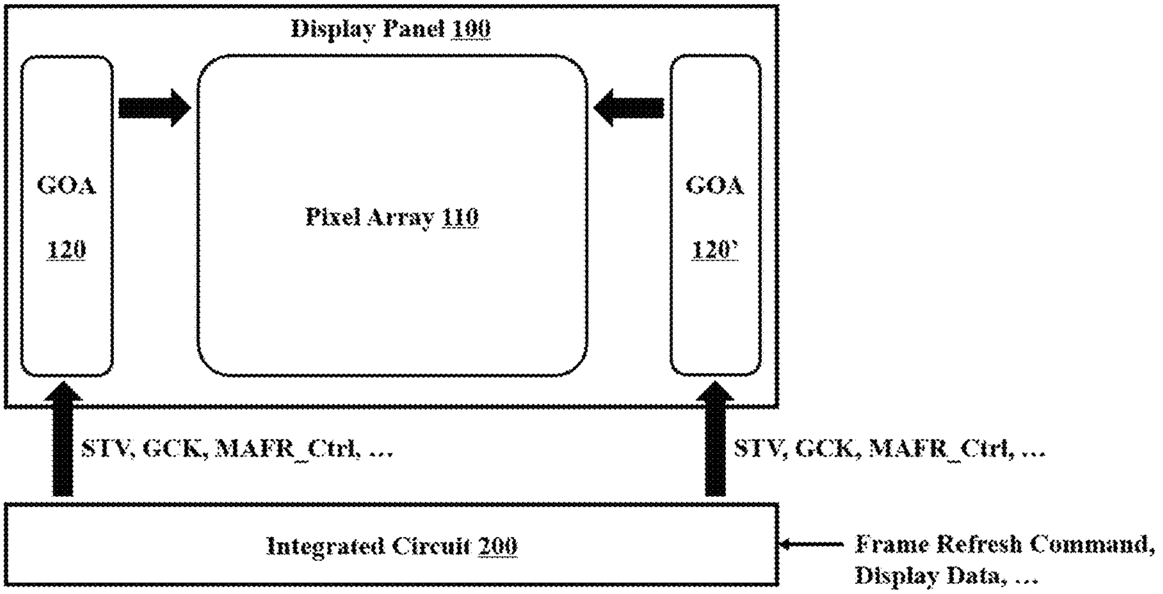
FIG. 1B is a block diagram illustrating another display panel and an integrated circuit for driving the display panel according to an embodiment of the present disclosure.

In addition, FIG. 1B is a block diagram illustrating another display panel and an integrated circuit for driving the display panel according to an embodiment of the present disclosure. Most of configurations of FIG. 1B and FIG. 1A are the same, and some of the block diagrams corresponding to the same configurations are omitted. FIG. 1B is differentiated from FIG. 1A in that a both-side drive structure is adopted, and as shown in the figure, symmetrical GOAs 120 and 120' are provided on both sides of the pixel array 110, and the both GOAs drive a gate electrode of the pixel array 110.

Figure 2:
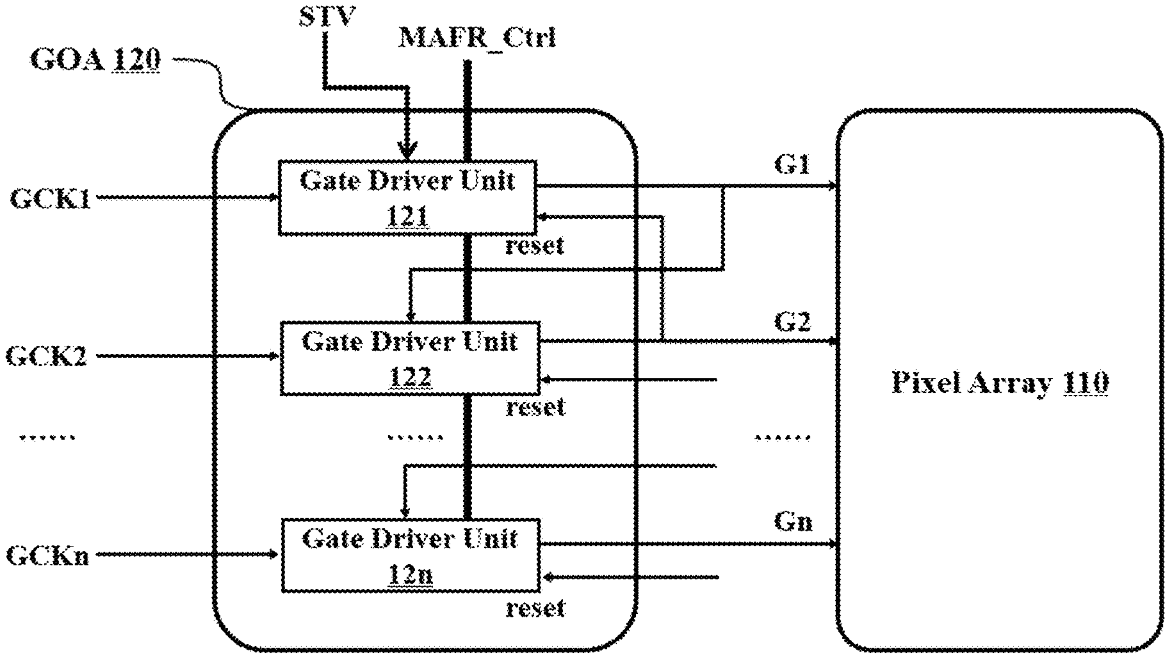
FIG. 2 is a schematic structural diagram illustrating a gate driver-on-array circuit according to an embodiment of the present disclosure.
Figure 3:
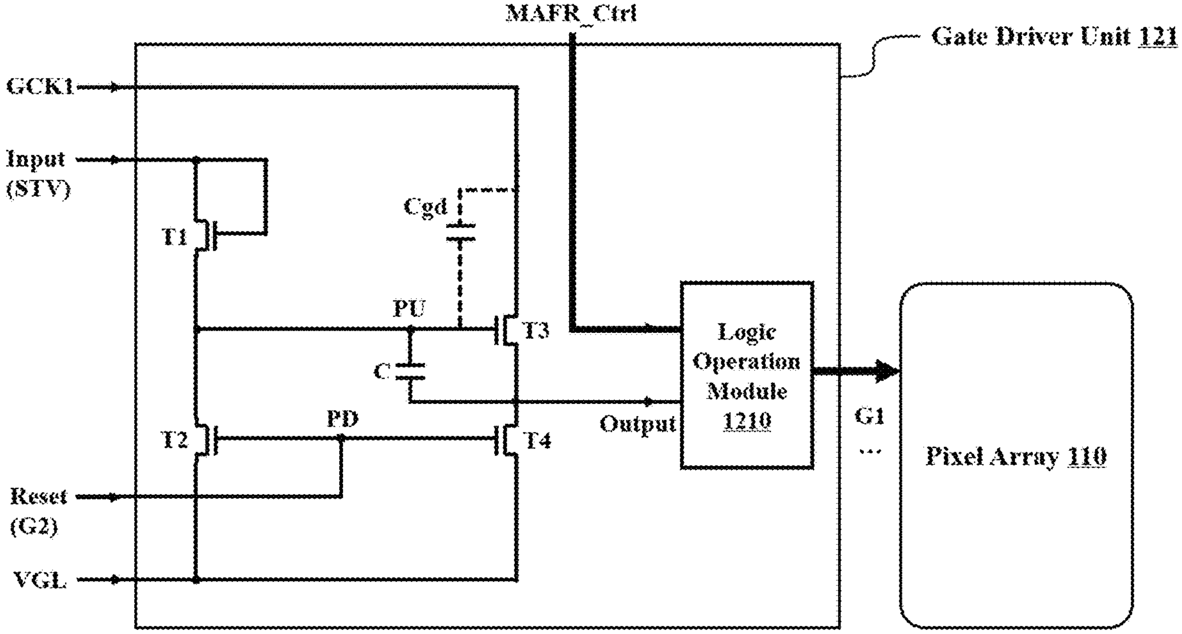
FIG. 3 is an example circuit diagram illustrating a first-stage gate driver unit of a gate driver-on-array circuit according to an embodiment of the present disclosure.
Figure 4:
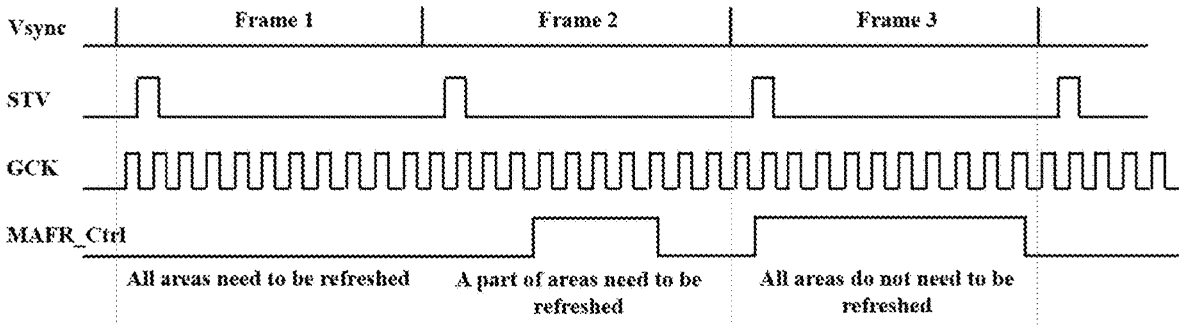
FIG. 4 is a conventional signal timing diagram for controlling a refresh operation.

In order to better understand the benefits of the present disclosure, the following will take the GOA 120 as an example to describe in detail the specific circuit structure as well as the driving principle in conjunction with FIGS. 2 to 4.

FIG. 2 is a schematic structural diagram illustrating the GOA 120 according to an embodiment of the present disclosure. As shown in FIG. 2, the GOA 120 includes a plurality of cascaded gate driver units. Each gate driver unit is coupled to a corresponding row of pixels in the pixel array 110 so that the pixel array 110 is subjected to progressive scanning by a signal transmission in a manner of a shift register. Specifically, the integrated circuit 200 sends a frame scanning start signal (e.g., the STV signal) as an input signal to a first-stage gate driver unit 121 in the GOA 120 so as to initiate the gate driver unit 121, so that the gate driver unit 121 can output a drive signal G1 for performing a refresh operation of a corresponding row of pixels, according to an area refresh control (MAFR_CTRL) signal and a gate clock (GCK1-GCKn) signal that are received from the integrated circuit 200. The drive signal G1 outputted by the first-stage gate driver unit 121 also serves as an input signal of a second-stage gate driver unit 122 to initiate this gate driver unit 122. A drive signal G2 outputted by the second-stage gate driver unit 122 also serves as a reset signal of the first-stage gate driver unit 121, so as to end the refresh operation of the first-stage gate driver unit 121.

More specifically, FIG. 3 illustrates an example circuit diagram of the first-stage gate driver unit 121 in the GOA 120, by way of example, a gate driver unit having a 4T1C structure, i.e., each gate driver unit may include four thin-film transistors T1 to T4 and a capacitor C, is illustrated as an example of the gate driver unit. Before the first-stage gate driver unit 121 receives a STV signal, a PU node is initially set at a low potential and the transistor T3 is set in an off state. In response to the STV signal, as an input signal (Input) of the first-stage gate driver unit 121, the transistor T1 is turned on, so that the potential of the PU node coupled to the capacitor C is pulled up and the transistor T3 is turned on. In this case, when a high level signal is output from GCK1, the potential of the PU node is further pulled up, so that current is output from a source electrode of the transistor T3 to generate an output signal (output) at a high level. On the other hand, as described above, in response to the drive signal G2 of the second-stage gate driver unit 122 that serves as the reset signal being input to a PD node, the transistors T2 and T4 are turned on, so that the capacitor C is connected to a low-level voltage (VGL) to discharge, and the level of the output signal becomes low. In this manner, the output signal can be further logically operated with an MAFR_CTRL signal by a logic operation module 1210 to generate the gate drive signal (G1) provided to the pixel array 110 from the gate driver unit 121, and the gate drive signal at a high/low level can then be applied to the corresponding gate line to realize gating of the corresponding row of pixels. Furthermore, as described above, the gate drive signal (G1) output from the first-stage gate driver unit 121 also serves as an input signal for a next-stage gate driver unit to initiate the gate driver unit 122. Similarly, the gate drive signal outputted by each gate driver unit of the plurality of cascaded gate driver units except the first-stage gate driver unit and the last-stage gate driver unit will be used as an input signal for a next-stage gate driver unit as well as a reset signal for a previous-stage gate driver unit, and the first-stage gate driver unit uses the frame scanning start signal as its input signal and does not output a reset signal, and the last-stage gate driver unit may be reset by an additional reset signal (e.g., from a redundancy unit).

However, for the display panel, such as a display panel based on multi-area frame rate control or adaptive frame rate, there may be frames in the display panel that do not need a refresh operation, e.g., the current frame to be displayed is a static picture. However, in the conventional drive method, a control signal for performing a refresh operation may be continuously outputted to the display panel, which may result in unnecessary power consumption of the display panel.

Specifically, FIG. 4 is a conventional signal timing diagram for controlling a refresh operation for a display panel. As shown in FIG. 4, by way of example, the driving logic in which the MAFR_Ctrl signal being at a low level is a valid state, for frame 1, if all MAFR_Ctrl signals are set at a low level, pixels corresponding to all areas in the frame 1 need to be refreshed; for frame 2, if a portion of the MAFR_Ctrl signals are set at a low level, pixels corresponding to a part of areas of the frame 2 need to be refreshed, where rows of pixels corresponding to MAFR_Ctrl signals at a high level do not need to be refreshed. However, for frame 3, all MAFR_Ctrl signals are set at a high level, then pixels corresponding to all areas in the frame 3 do not need to be refreshed, i.e., the current frame 3 does not need to be refreshed. In this case, the STV signal, however, is still output, which causes a switch element in the GOA 120 (e.g., the T1 in FIG. 3) to be turned on or off unnecessarily, thus resulting in the additional switching loss. In addition, when the MAFR_Ctrl signal is set in an invalid state, the logic level of the continuously input GCK signal is frequently toggled, thus resulting in a large amount of parasitic loss in a parasitic capacitor of the transistor (e.g., Cgd between a gate electrode and a drain electrode of the T3 in FIG. 3), which increases the power consumption of the GOA 120, and also causes the problems such as an increase in the overall power consumption and heat generation of the display panel. As can be seen, for the case where the current frame does not need to be refreshed, there is still unnecessary power consumption in the display panel, and this problem also exists in display panels based on other frame refresh technologies.

At least to solve the above problems, the present disclosure proposes a method capable of dynamically adjusting a frame scanning start signal and a gate clock signal, and a corresponding integrated circuit. For a frame that does not need to be refreshed, the frame scanning start signal will not be provided to the display panel, so that the switching loss of the gate driving circuit is reduced. Moreover, by dynamically adjusting the frequency or logic level of the gate clock signal, the parasitic loss in the circuit is further reduced while ensuring normal display.

Various examples of the method according to an embodiment of the present disclosure will be described below with reference to FIGS. 5 to 8.

Figure 5:
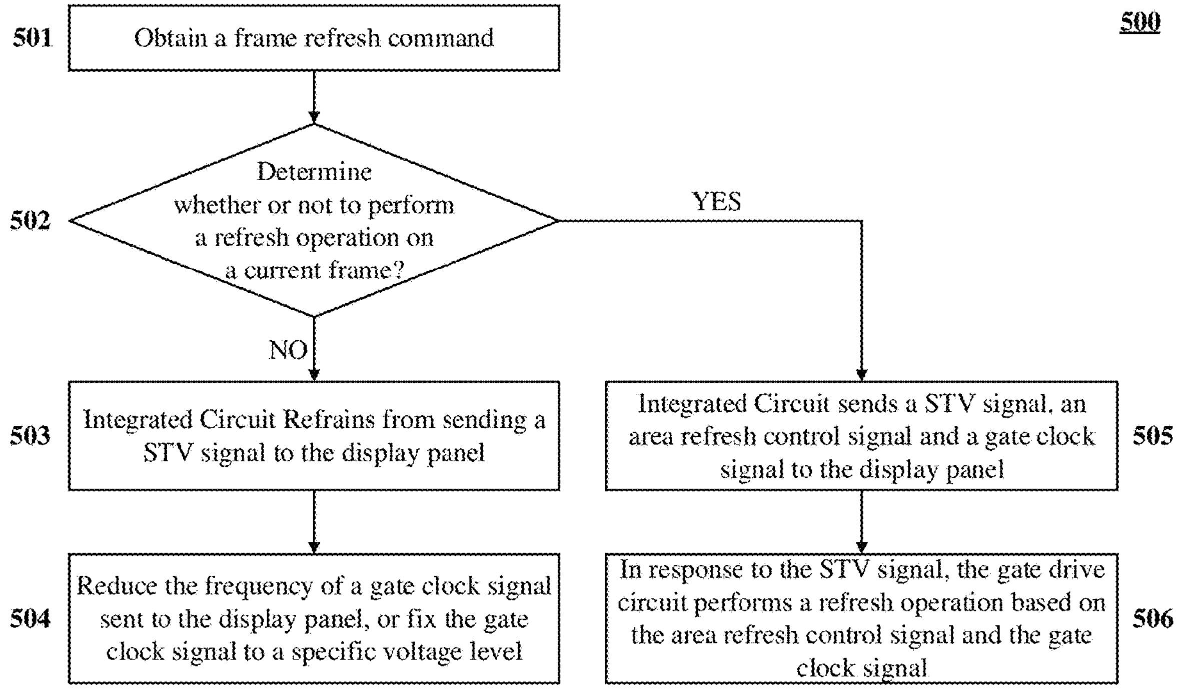
FIG. 5 is an overall flowchart illustrating a method for an integrated circuit to drive a display panel according to an embodiment of the present disclosure.

FIG. 5 is an overall flowchart illustrating a method for driving a display panel according to an embodiment of the present disclosure. As shown in FIG. 5, the method 500 may include the following steps.

At step S501, frame refresh information for controlling a refresh operation of the display panel is obtained. The frame refresh information may instruct explicitly or implicitly whether or not to perform the refresh operation on at least part of areas in the current frame, e.g., to instruct to perform the refresh operation on the entire current frame, or to perform the refresh operation on different portions in the current frame, or not to perform the refresh operation on the current frame. As described above, the integrated circuit may be configured to receive the frame refresh information from an external device or other elements of the device (e.g., a processor in an electronic device) or may derive the frame refresh information indicating whether or not to perform the refresh operation on at least part of areas in the current frame from display data for displaying the current frame.

At step S502, whether or not to perform the refresh operation on the current frame is determined based on the frame refresh information. For example, an interface unit 230 of the integrated circuit 200 may further include a signal decoder (not shown), which may decode information received externally such as the frame refresh information indicating whether or not to perform the refresh operation on the current frame, to determine whether or not to perform the refresh operation on the current frame. As described above, it can be determined, for example, to perform the refresh operation on all areas in the current frame (e.g., corresponding to the frame 1 in FIG. 4), to perform the refresh operation on part of areas in the current frame (e.g., corresponding to the frame 2 in FIG. 4), or not to perform the refresh operation on all the areas in the current frame (e.g., corresponding to the frame 3 in FIG. 4), according to the obtained frame refresh information.

When the frame refresh information indicates not to perform the refresh operation on all areas in the current frame, proceed to steps S503 and S504. In step S503, the integrated circuit refrains from sending the frame scanning start signal to the display panel. And optionally, in step S504, the integrated circuit may also fix the gate clock signal to a specific voltage level or reduce the frequency of sending the gate clock signal. In addition, the order of steps S503 and S504 shown in FIG. 5 is only for illustration, and the two steps may actually be carried out in parallel or in any order, and the corresponding operations of the two steps correspond to FIGS. 6 and 7, respectively.

Figure 6:
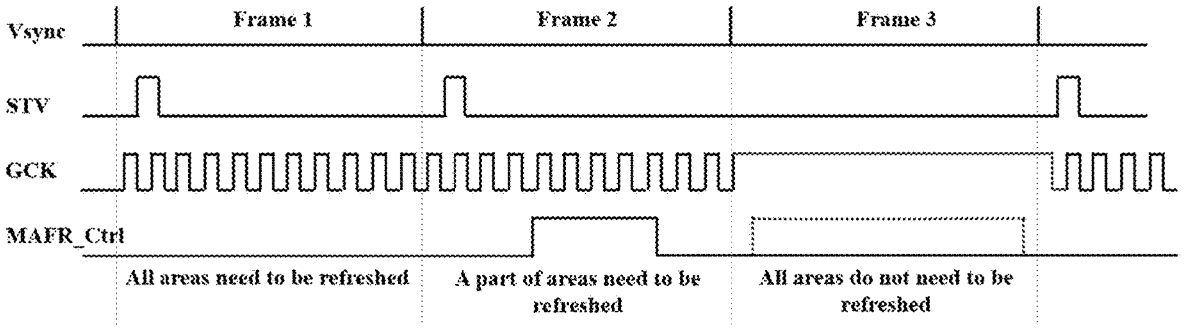
FIGS. 6 and 7 are signal timing diagrams for controlling a refresh operation according to an embodiment of the present disclosure.

Specifically, as shown in FIG. 6, for the frame 3 which is determined not to be subject to a refresh operation according to the frame refresh information, the integrated circuit does not send (i.e., refraining from sending) the frame scanning start signal to the gate driver circuit of the display panel (e.g., the gate driver circuit of the GOA 120). As described above in conjunction with FIGS. 2 to 3, since there is no frame scanning start signal to be used as a trigger signal to initiate gate scanning, the corresponding switch elements in the gate driver circuit (e.g., the T1 to T4 in FIG. 3) do not perform switching operations, the generation of corresponding switching loss is avoided, and the power consumption of the display panel can be effectively reduced. Accordingly, the gate driver circuit will not output the gate drive signals G1 to GN, and therefore, as shown by the dotted line in the FIG. 6, the logic level of the MAFR_Ctrl signal for the frame 3 can be set to high or low, and no refresh operation is performed on the array of pixels displaying the current frame regardless of the logic level of the MAFR_Ctrl signal. Additionally or alternatively, the integrated circuit may also fix the gate clock signal sent to the display panel to a specific voltage level, for example, to a constant high or low level. Then, since the logic level of the clock signal does not toggle, the charging and discharging behavior of the parasitic capacitor (e.g., Cgd in FIG. 3) within the gate driver circuit can be effectively suppressed, thereby reducing the parasitic loss, and further reducing the power consumption of the display panel.

In addition, in some application scenarios, if the logic level of the clock signal does not toggle during the period of not refreshing the current frame, charges in a capacitive element of the display panel may not be released. In this case, if the clock signal is toggled again from a fixed constant level due to the next frame needing to be refreshed, charges in the circuit may carry out an undesired charging and discharging operations under a capacitive coupling effect to cause a display abnormality such as false illumination.

Figure 7:
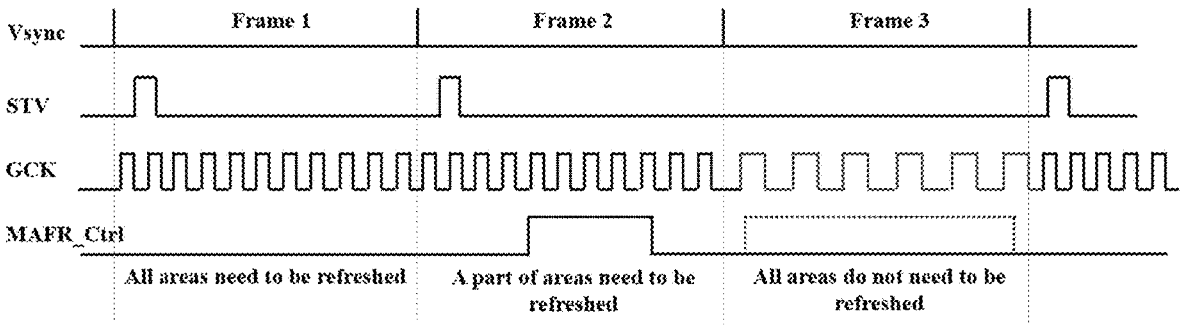

Therefore, in view of the above scenarios, as shown in FIG. 7, instead of fixing the gate clock signal to a constant high or low voltage, the integrated circuit may reduce the frequency of sending the gate clock signal, for example, reduce to ½ or ⅓ of the original frequency. Since the loss of the parasitic capacitor is positively correlated with the frequency, the parasitic loss can be reduced as a decrease of the frequency of the gate clock signal. For example, for a display panel having 1024 rows of pixels, in order to display a current frame at a frame rate of 60 Hz, it is necessary to scan the 1024 rows; the frequency of the corresponding GCK signal is equal to the frame rate multiplied by the number of rows, i.e., $60\times1024=61440$ Hz. If the frequency of the GCK signal is reduced to, for example, ⅓ of the frequency, i.e., 20480 Hz, the loss caused by the parasitic capacitor can be reduced significantly, while the charge release mechanism in the display panel is also maintained. Thus, for specific types of display panels or application scenarios, the method of this embodiment can be selectively used or combined to reduce the power consumption of the display panel. In addition, similar to the FIG. 6, as shown by the dotted line in the FIG. 7, the logic level of the MAFR_Ctrl signal for the frame 3 can be set to high or low, and no refresh operation is performed on the array of pixels displaying the current frame regardless of the logic level of the MAFR_Ctrl signal.

On the other hand, when the obtained frame refresh information indicates to perform the refresh operation on the current frame (e.g., to perform the refresh operation on all areas or only a part of the areas), proceed to step S505, in which the integrated circuit sends the frame scanning start signal, as well as the area refresh control signal and the gate clock signal to the display panel. As described above, the integrated circuit may send the frame scanning start signal to the gate driver circuit (e.g., the GOA 120) of the display panel to initiate the execution of the refresh operation, and may send the area refresh control signal and the gate clock signal, so that the gate driver circuit performs the corresponding refresh operation based on the refresh control signal and the gate clock signal.

At step S506, in response to receiving the frame scanning start signal from the integrated circuit, the gate driver circuit performs the refresh operation based on the area refresh control signal and the gate clock signal. As described above, taking the GOA as an example, the first-stage gate driver unit receives the frame scanning start signal to initiate the gate driver unit, and outputs a drive signal for performing the refresh operation for a corresponding row of pixels based on the refresh control signal and the gate clock signal. The outputted drive signal is used as an input signal of a next-stage gate driver unit, and the output signal of the next-stage gate driver unit is used as its own reset signal, and so on. In this way, the pixel array is refreshed row by row.

Still taking the gate driver unit shown in FIG. 3 as an example, in the case that the signal Output is valid at a high level, the MAFR_Ctrl is valid at a low level, and the gate driver signal G1 is valid at a low level, the logic circuit of the gate driver unit may include an inverter and an "or" gate. For example, the signal Output is sent to an input end of the inverter, and an output end of the inverter and the MAFR_Ctrl are coupled to the two input ends of the "or" gate, respectively. Thus, when Output=1 and MAFR_Ctrl=0, G1=0, i.e., when the first row of pixels needs to be refreshed with MAFR, the drive signal for scanning a first row of pixels is output; and when Output=1 and MAFR_Ctrl=1, G1=1, i.e., when the first row of pixels does not need to be refreshed with MAFR, the drive signal for scanning the first row of pixels is not output. It should be understood that the structure of the logic circuit is only an example, and the structure of the logic circuit can be designed according to needs and based on the specific structure of the driver circuit and the drive configuration of the pixel array, and the like.

As can be seen, the above-mentioned method for driving the display panel according to the present disclosure provides a driving solution based on the dynamic frame start scanning signal, that is, for a frame that does not need to be refreshed, the frame start scanning signal is not provided, and accordingly the switching loss in the circuit is reduced. Moreover, the above-mentioned method for driving the display panel according to the present disclosure further proposes a driving solution based on the dynamic gate clock signal, in which, for a frame that does not need to be refreshed, the frequency of the gate clock signal is reduced or fixed to a specific level, thereby further reducing the parasitic loss in the circuit.

Next, a specific application scenario of the method according to an embodiment of the present disclosure is described with reference to FIG. 8. In the example, the method described above in the present disclosure is applied to the display panel based on multi-area frame rate control, and it is to be understood that the technical solutions of the present disclosure may also be applied to display panels using other frame refresh technologies such as adaptive frame rate.

Figure 8:
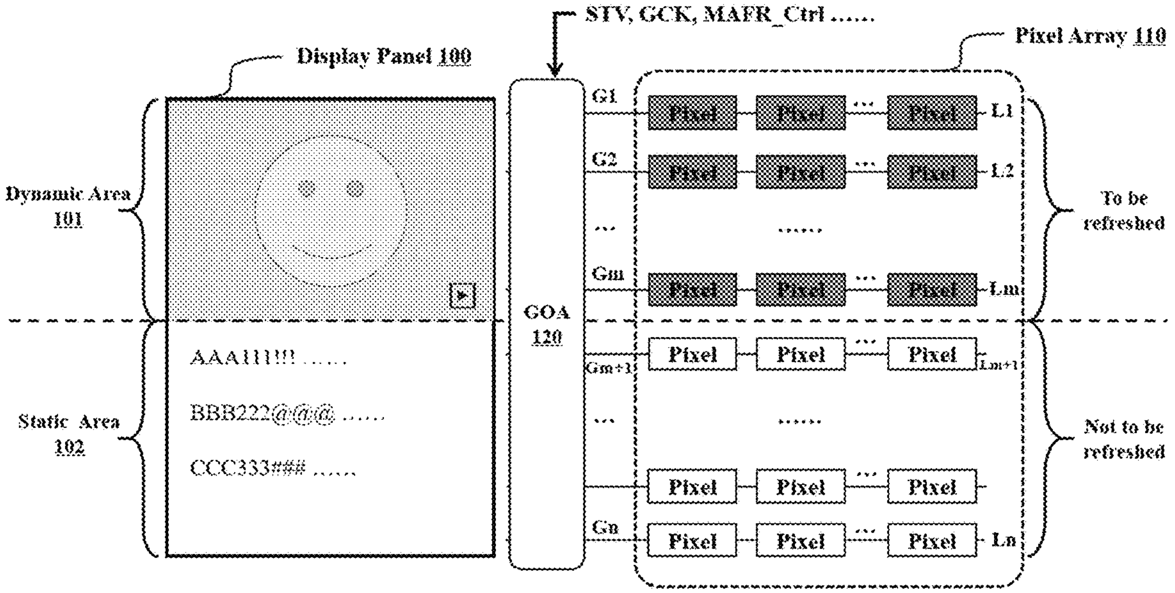
FIG. 8 is a schematic diagram illustrating a display panel based on multi-area frame rate control according to an embodiment of the present disclosure.

FIG. 8 is a schematic diagram illustrating a display panel based on multi-area frame rate control according to an embodiment of the present disclosure. As shown in FIG. 8, the display panel 100 plays a video from a video website. The upper part of the display panel 100 is an area where the video is being played, in which the displayed image changes dynamically, i.e., corresponding to a dynamic area 101 of the display panel 100; the lower part of the display panel 100 is a comment area of the video, in which the displayed image does not change substantially, i.e., corresponding to a static area 102 of the display panel 100. In this scenario, for a plurality of consecutive frames over a period of time, it is possible to perform a refresh operation only for a plurality of pixels (pixels in rows L1 to Lm) in the pixel array 110 of the display panel 100 corresponding to the dynamic area 101, and not perform a refresh operation for a plurality of pixels (pixels in rows Lm+1 to Ln) in the display panel 100 corresponding to the static area 102. To realize such multi-area frame rate control, the STV, GCK, and MAFR_Ctrl signals described above may be used to control the GOA 120 according to the embodiments of the present disclosure to drive the corresponding rows of pixels. Moreover, the overall power consumption of the display panel is reduced by applying the method of the embodiments of the present disclosure.

First, the method of the present disclosure may be performed with reference to a signal timing of the frame 2 in FIG. 6 for the frame in which the refresh operation is performed only on some areas (i.e., the static area 102) described above. Specifically, the integrated circuit 200 provides the GOA 120 of the display panel 100 with the STV signal for initiating the refresh operation, the GCK signal determined based on the frame rate to be displayed and the number of pixel rows, and the MAFR_Ctrl signal corresponding to the area to be refreshed; and in response to the STV signal that is received by the first-stage gate driver unit 121 of the GOA 120 from the integrated circuit 200, the refresh operation for pixels in row L1 is initiated; and the gate drive signal G1 is output to a gate line corresponding to the pixels in row L1 in accordance with the logic levels of the MAFR_Ctrl signal and the GCK signal; and the refresh operation for pixels in rows L1 to Lm is initiated and performed sequentially until the logic level of the MAFR_Ctrl signal is set to an invalid state (i.e., toggled to a high level). In addition, since the logic level of the MAFR_Ctrl signal is set to an invalid state, no gate drive signal is output after an output signal in the corresponding gate driver unit is logically operated with the MAFR_Ctrl signal, so that the refresh operation is not performed for the pixels in rows Lm+1 to Ln. In this manner, a refresh operation is performed on the dynamic area 101 while the static area 102 is kept from being refreshed in the display panel, thereby realizing different frame rate control for multiple areas.

In addition, for a frame in which the refresh operation is not performed for all the area, for example, all the areas of display panel are displaying the comment area, the method of the present disclosure may be performed with reference to a signal timing of the frame 3 in FIGS. 6 and 7. Specifically, when the frame refresh information indicates not to perform a refresh operation on the current frame, the integrated circuit 200 refrains from providing the STV signal for initiating the refresh operation to the display panel 100, and optionally, fixes the GCK signal to a specific voltage level or reduces the frequency of the GCK signal. As described above, since the STV signal is not received by the GOA 120, none of the switch elements in the gate driver unit (e.g., the T1 to T4 in FIG. 3) is turned on in response to the STV signal, thus avoiding additional switching loss. Moreover, when the GCK signal is fixed to a specific voltage level, the charging and discharging behavior of the parasitic capacitor (e.g., Cgd in FIG. 3) within the gate driver circuit is effectively suppressed because the logic level of the clock signal does not toggle, thereby reducing the parasitic loss, and the power consumption of the display panel can thus be further reduced. In addition, for certain types of display panels or application scenarios, in order to avoid abnormal display possible to occur, the approach of reducing the frequency of sending the GCK signal may be replaced with the approach of fixing the signal to a specific voltage level, so that the loss caused by the parasitic capacitor can be reduced while the charge release mechanism in the display panel can be maintained.

In the above example, the area, in the display panel based on the multi-area frame rate control, using different frame rates is divided into 2 areas. It is to be understood that in other examples, depending on the specific application scenario, it is also possible to divide the areas in the display panel using different frame rates into more areas, or allow the entire display panel to use the same frame rate. Moreover, it is to be understood that in other examples, depending on the specific application scenario, any area in the display panel can be designated as an area to be refreshed, for example, it may refer to the pixels in rows L1 to Lm of the display panel, the pixels in rows LN-n to LN of the display panel, or the pixels in rows Lp to Lp+q in the middle of the display panel; or it may refer to the pixels in rows L1 to Lm and columns Ca to Ca+b, the pixels in rows LN-n to LN and columns Ca to Ca+b of the display panel, and the pixels in rows Lp to Lp+q and columns Ca to Ca+b in the middle of the display panel (where N is the total number of rows of the display panel, and m, n, p, q, a, and b are integers).

As can be seen from the above description, the method of the present disclosure can be applied to, e.g., the display panel based on multi-area frame rate control, to realize local refresh of the display panel by using the multi-area frame rate control technology, thereby ensuring smooth video playing while reducing the power consumption of the display panel to a certain extent. In addition, for a frame that does not need to be refreshed, the power consumption of the gate driver circuit is reduced by a dynamic STV-based driving solution; and by a dynamic GCK-based driving solution, the overall power consumption of the display panel is further reduced on the premise of ensuring the normal display.

Examples of an integrated circuit for driving a display panel and a display apparatus including the display panel and the integrated circuit according to embodiments of the present disclosure are described below.

According to an embodiment of the present disclosure, the integrated circuit may include a module, configured to determine whether or not to perform a refresh operation on a current frame to be displayed by the display panel; and a module, configured to send the above-mentioned signal for the refresh operation, e.g., the signals including the frame scanning start signal and the gate clock signal, to the display panel. In addition, according to an embodiment of the present disclosure, the integrated circuit may further include a module for obtaining frame refresh information, the frame refresh command indicating whether or not to perform the refresh operation on the current frame to be displayed by the display panel, such that the integrated circuit may determine whether or not to perform the refresh operation on at least part of areas in the current frame according to the obtained frame refresh information, and perform the above-described method of the present disclosure, depending on whether or not the current frame or at least part of areas therein needs to be refreshed. The integrated circuit may perform the method as described above in conjunction with FIGS. 1 to 7, which will not be repeated herein.

In addition, according to an embodiment of the present disclosure, the display apparatus may include the display panel and the integrated circuit as described above. The display panel may further include a gate driver circuit such as the above-mentioned GOA 120 in conjunction with FIGS. 1 to 3.

Additionally, the present disclosure may further provide a computer-readable storage medium storing computer instructions, and a computer program product including the computer instructions. When the computer program instructions are executed by a processor, the steps performed by the processor as described above are implemented, which are consistent with the corresponding content of the respective embodiments described above in conjunction with FIGS. 1 to 7. It should be understood that each of the components or modules of the apparatus described above may be implemented by hardware or by software, and may also be implemented by a combination of hardware and software.

It should be noted that in the present disclosure, since the disclosed technical solutions do not focus on improvements in the structure of the display panel, a strict distinction between the display panel and a screen will not be made in the present disclosure, for example, in the examples herein, the display panel 100 may refer to screens of various display apparatuses, which may, for example, include a smartphone, a smart TV, an electronic picture frame, a tablet computer, a laptop-type computer, and the like.

In addition, the display panel of the present disclosure may also utilize other types of gate drivers in the art, and the gate drivers may be provided separately from the integrated circuit, or the gate drivers may be integrated into the integrated circuit. Furthermore, in other examples, the integrated circuit of the present disclosure may be provided as a separate integrated circuit, or may also be integrated into the display panel.

In addition, only signals related to the core technical solutions of the present disclosure are shown in the figures of the present disclosure, and the respective elements in the figures may also input and output other signals not shown, for example, signals such as a high-level voltage VGH output from a driving power supply. In addition, for the purpose of illustration only, signal lines in the respective figures may represent the transmission paths of one or more signals, for example, the clock signal may include more than one signal such as a forward clock signal and a backward clock signal (CLKF and CLKB, not shown), and the MAFR_Ctrl signal may also include more than one signal (MAFR_Ctrl1, MAFR_Ctrl2, . . . , MAFR_Ctrln, not shown) that are used for controlling pixels to perform multiple reset actions.

The method for an integrated circuit to drive a display panel, the integrated circuit, and the display apparatus of the present disclosure are exemplarily described above with reference to the respective figures. By the method and the integrated circuit of the present disclosure, the action of sending related signals to the display panel can be adjusted according to whether the current frame or at least part of areas therein needs a refresh operation, and the circuit power consumption due to the parasitic capacitor in the display panel can be reduced when the current frame does not need the refresh operation, thereby reducing the overall power consumption of the display panel.

The advantages, effects, and the like mentioned in the embodiments of the present disclosure are only examples and not limitations, and it should not be considered that these advantages, effects and the like are necessary for each embodiment of the present disclosure. In addition, the specific details disclosed above are only for the purpose of example and easy understanding, but not for limitation, and the above details do not limit the present disclosure to be implemented by using the above specific details. It should also be noted that in the apparatus and method of the present disclosure, the components or steps may be decomposed and/or recombined. The decomposition and/or recombination should be considered as an equivalent solution of the present disclosure.

It will be appreciated by a person of ordinary skill in the art that all or some of the methods and apparatuses of the present disclosure may be implemented in hardware, firmware, software, or combinations thereof, in any computing devices (including a processor, a storage medium, etc.) or networks of the computing devices. The hardware may be a general-purpose processor, a digital signal processor (DSP), an application-specific integrated circuit (ASIC), a field-programmable gate array signal (FPGA) or another programmable logic device (PLD), a discrete gate or transistor logic device, a discrete hardware component, or any combination thereof, that is designed to carry out the functions described herein. The general-purpose processor may be a microprocessor, but as an alternative, the processor may be any commercially available processor, controller, microcontroller, or state machine. The processor may also be implemented as a combination of computing devices, such as a combination of a DSP and a microprocessor, a plurality of microprocessors, one or more microprocessors collaborated with a DSP core, or any other such configurations. The software may be present in any form of computer-readable tangible storage medium. By way of example and not limitation, such computer-readable tangible storage medium may include a RAM, a ROM, an EEPROM, a CD-ROM or another optical disk storage and disk storage, or another magnetic memory or any other tangible medium that can be used to carry or store expected program code in the form of instructions or data structures and that can be accessed by a computer. As used herein, disks include compact disks (CDs), laser disks, compact discs, digital versatile disks (DVDs), floppy disks, and Blue-ray disks.

The block diagrams of the elements, components, devices, apparatuses, and systems involved in the embodiments of the present disclosure are intended to be illustrative only and are not intended to require or imply that they should be connected, arranged, or configured in the manner illustrated in the block diagrams. As those skilled in the art will appreciate, the elements, components, devices, apparatuses, and systems may be connected, arranged, and configured in any manner.

Further, the scope of protection of the present disclosure is not limited to the specific aspects of the processing, machine, manufacturing, event components, means, methods, and actions described above. Compositions, means, methods, or actions of the processing, machines, manufacturing, events that currently exist or are to be developed later that perform substantially the same functions or achieve substantially the same results as the corresponding aspects described herein may be utilized.

In addition, wording such as “include,” “comprise,” “have” and the like are open-ended words, meaning “including but not limited to”, and may be used interchangeably therewith. The words “or” and “and” as used herein refer to the words “and/or” and may be used interchangeably therewith, unless the context clearly indicates otherwise. As used herein, the word “such as” refers to the phrase “such as, but not limited to” and may be used interchangeably therewith.

The above description of the disclosed aspects is provided to enable any person skilled in the art to make or use the present disclosure. Various modifications to these aspects will be readily apparent to those skilled in the art, and the generic principles defined herein may be applied to other aspects without departing from the scope of the present disclosure. Therefore, the present disclosure is not intended to be limited to the aspects illustrated herein, but rather to follow the broadest scope consistent with the principles and novel features disclosed herein.

The invention claimed is:

1. A method for driving a display panel based on multi-area frame rate control, comprising:

receiving frame refresh information, the frame refresh information indicating whether or not to perform a refresh operation on at least part of areas in a current frame;

sending a frame scanning start signal for initiating the refresh operation and a gate clock signal for performing the refresh operation to the display panel, in response to the frame refresh information indicating that the refresh operation is performed on at least part of areas in the current frame; and refraining from sending the frame scanning start signal to the display panel and reducing a frequency of the gate clock signal, in response to the frame refresh information indicating that the refresh operation is not performed on all areas in the current frame and the refresh operation is performed on at least part of areas in the next frame of the current frame.

2. The method according to claim 1, further comprising:

sending the frame scanning start signal to the display panel to initiate the refresh operation on the at least part of areas, in response to determining that the refresh operation is performed on at least part of areas in the current frame, sending the frame scanning start signal to a gate driver-on-array circuit of the display panel and sending a refresh control signal and the gate clock signal, in response to the frame refresh information indicating that the refresh operation is performed on the at least part of areas in the current frame; and wherein the gate driver-on-array circuit comprises a plurality of cascaded gate driver units, and in response to a first-stage gate driver unit of the gate driver-on-array circuit receiving the frame scanning start signal, the gate driver-on-array circuit performs the refresh operation on the at least part of areas based on the refresh control signal and the gate clock signal.

3. An integrated circuit for driving a display panel based on multi-area frame rate control, comprising:

a module, configured to receive frame refresh information, the frame refresh information indicating whether or not to perform a refresh operation on at least part of areas in a current frame, a module, configured to send a frame scanning start signal for initiating the refresh operation and a gate clock signal for performing the refresh operation, to the display panel, wherein the integrated circuit is configured to send the frame scanning start signal and the gate clock signal to the display panel, in response to the frame refresh information indicating that the refresh operation is performed on at least part of areas in the current frame, and refrain from sending the frame scanning start signal to the display panel and reduce a frequency of the gate clock signal sent to the display panel, in response to the frame refresh information indicating that the refresh operation is not performed on all areas in the current frame and the refresh operation is performed on at least part of areas in the next frame of the current frame.

4. The integrated circuit according to claim 3, further comprising:

a module, configured to obtain frame refresh information, wherein the frame refresh information indicates whether or not to perform the refresh operation on at least part of areas in the current frame, and the integrated circuit is further configured to:

determine whether or not to perform the refresh operation on the at least part of areas in the current frame based on the frame refresh information; and refrain from sending the frame scanning start signal to the display panel and reduce the frequency of the gate clock signal, in response to determining that the refresh operation is not performed on all areas in the current frame wherein the integrated circuit is further configured to send the frame scanning start signal to a gate driver-on-array circuit of the display panel and send a refresh control signal and the gate clock signal, in response to the frame refresh information indicating that the refresh operation is performed on at least part of areas in the current frame;

wherein the gate driver-on-array circuit comprises a plurality of cascaded gate driver units, and in response to a first-stage gate driver unit of the gate driver-on-array circuit receiving the frame scanning start signal, the gate driver-on-array circuit performs the refresh operation on the at least part of areas based on the refresh control signal and the gate clock signal.

5. A display apparatus, comprising:

a display panel based on multi-area frame rate control, comprising a gate driver-on-array circuit, the gate driver-on-array circuit comprising a plurality of cascaded gate driver units; and an integrated circuit, configured to receive frame refresh information indicating whether or not to perform a refresh operation on at least part of areas in a current frame to be displayed by the display panel, and to send a frame scanning start signal for initiating the refresh operation and a gate clock signal for performing the refresh operation to the gate driver-on-array circuit, wherein the integrated circuit is further configured to send the frame scanning start signal and the gate clock signal to the display panel, in response to the frame refresh information indicating that the refresh operation is performed on at least part of areas in the current frame, and refrain from sending the frame scanning start signal to the display panel and reduce a frequency of a gate clock signal sent to the display panel, in response to the frame refresh information indicating that the refresh operation is not performed on all areas in the current frame and the refresh operation is performed on at least part of areas in the next frame of the current frame.

6. The display apparatus according to claim 5, wherein, in response to a first-stage gate driver unit of the gate driver-on-array circuit receiving the frame scanning start signal, the gate driver-on-array circuit performs the refresh operation on the at least part of areas based on the refresh control signal and the gate clock signal.

* * * * *